(12) United States Patent
Liu et al.

(10) Patent No.: US 9,088,991 B2
(45) Date of Patent: Jul. 21, 2015

(54) WLAN TRANSMIT MODES AND COEXISTENCE

(71) Applicant: MARVELL WORLD TRADE LTD., St. Michael (BB)

(72) Inventors: Yong Liu, Campbell, CA (US); Hongyuan Zhang, Sunnyvale, CA (US); Raja Banerjea, Sunnyvale, CA (US)

(73) Assignee: MARVELL WORLD TRADE LTD, St. Michael (BB)

( * ) Notice: Subject to any disclaimer, the term of this patent is extended or adjusted under 35 U.S.C. 154(b) by 100 days.

(21) Appl. No.: 13/667,935

(22) Filed: Nov. 2, 2012

(65) Prior Publication Data
US 2013/0107833 A1   May 2, 2013

Related U.S. Application Data

(60) Provisional application No. 61/554,889, filed on Nov. 2, 2011.

(51) Int. Cl.
| | |
|---|---|
| *H04W 72/04* | (2009.01) |
| *H04W 24/02* | (2009.01) |
| *H04W 72/08* | (2009.01) |
| *H04W 84/12* | (2009.01) |

(52) U.S. Cl.
CPC ........ *H04W 72/082* (2013.01); *H04W 72/0453* (2013.01); *H04W 84/12* (2013.01)

(58) Field of Classification Search
CPC .......... H04W 72/082; H04W 72/0453; H04W 84/12; H04W 16/14; H04W 24/00; H04W 72/04
USPC ........ 370/319, 329, 338, 343; 455/63.1, 63.2, 455/450, 452.1
See application file for complete search history.

(56) References Cited

U.S. PATENT DOCUMENTS

| | | | |
|---|---|---|---|
| 7,599,332 | B2 | 10/2009 | Zelst et al. |
| 7,742,390 | B2 | 6/2010 | Mujtaba |
| 8,144,647 | B2 | 3/2012 | Nabar et al. |

(Continued)

FOREIGN PATENT DOCUMENTS

| | | |
|---|---|---|
| WO | WO-2012/030479 A1 | 3/2012 |
| WO | WO-2012/122119 A1 | 9/2012 |

OTHER PUBLICATIONS

International Search Report and Written Opinion in corresponding PCT/US2012/063278 mailed Feb. 4, 2013.

(Continued)

*Primary Examiner* — Ahmed Elallam

(57) ABSTRACT

A set of channels is scanned, each channel in the set having a first bandwidth. When it is determined that one or more channels in the set of channels are not being utilized by one or more other wireless communication systems, a channel not being utilized is selected as a primary channel for a wireless communication system. When it is determined that all channels in the set of channels are being utilized by one or more other wireless communication systems, (i) a channel in the set that is aligned with a primary channel of another wireless communication system is selected as the primary channel, or (ii) a channel in the set that overlaps with a secondary channel of another wireless communication system is selected as the primary channel, where the secondary channel of the other wireless communication system has a bandwidth greater than the first bandwidth.

28 Claims, 8 Drawing Sheets

(56) References Cited

U.S. PATENT DOCUMENTS

| | | | |
|---|---|---|---|
| 8,155,138 | B2 | 4/2012 | Van Nee |
| 8,289,869 | B2 | 10/2012 | Sawai |
| 8,526,351 | B2 | 9/2013 | Fischer et al. |
| 8,619,907 | B2 | 12/2013 | Mujtaba et al. |
| 8,670,399 | B2* | 3/2014 | Liu et al. ............ 370/329 |
| 8,687,583 | B2* | 4/2014 | Noh et al. ............ 370/329 |
| 8,724,720 | B2 | 5/2014 | Srinivasa et al. |
| 8,867,653 | B2 | 10/2014 | Zhang et al. |
| 8,948,283 | B2 | 2/2015 | Zhang |
| 2006/0159003 | A1 | 7/2006 | Nanda et al. |
| 2007/0105552 | A1* | 5/2007 | Hun et al. ............ 455/434 |
| 2009/0067403 | A1 | 3/2009 | Chan et al. |
| 2009/0196163 | A1 | 8/2009 | Du |
| 2011/0002219 | A1 | 1/2011 | Kim et al. |
| 2011/0116401 | A1* | 5/2011 | Banerjea et al. ............ 370/252 |
| 2012/0069746 | A1 | 3/2012 | Park |
| 2012/0082147 | A1* | 4/2012 | Liu et al. ............ 370/338 |
| 2012/0113903 | A1* | 5/2012 | Kneckt et al. ............ 370/329 |
| 2012/0163331 | A1* | 6/2012 | Chan et al. ............ 370/329 |
| 2012/0176974 | A1* | 7/2012 | Abraham et al. ............ 370/329 |
| 2012/0201316 | A1 | 8/2012 | Zhang et al. |
| 2012/0238226 | A1* | 9/2012 | Vermani et al. ............ 455/118 |
| 2012/0294294 | A1 | 11/2012 | Zhang |
| 2013/0107829 | A1* | 5/2013 | Shao et al. ............ 370/329 |
| 2013/0107830 | A1* | 5/2013 | Jones et al. ............ 370/329 |

OTHER PUBLICATIONS

Park, "IEEE 802.11ac: Dynamic Bandwidth Channel Access," 2011 IEEE Int'l Conf. on Communications (ICC), pp. 1-5, Jun. 2011.

Perahia, et al., "Gigabit Wireless LANs: an overview of IEEE 802.11ac and 80211ad," ACM SIGMOBILE Mobile Computing and Communications Review, vo. 15, No. 3, pp. 23-33, Jul. 2011.

Liu, et al., "VTH BSS Channel Selection," Institute of Electrical and Electronics Engineers, Inc., doc. No. IEEE 802.11-11/1433r0 (Nov. 2011).

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," The Institute of Electrical and Electronics Engineers, Inc., Nov. 2011.

Park, "Proposed Specification Framework for TGah", The Institute of Electrical and Electronics Engineers, doc. No. IEEE 802.11-11/1137r6, (Mar. 2012).

IEEE Std 802.11b-1999/Cor Jan. 2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," The Institute of Electrical and Electronics Engineers, Inc., Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," The Institute of Electrical and Electronics Engineers, Inc., Apr. 2003.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," The Institute of Electrical and Electronics Engineers, Inc., (1999).

de Vegt, "Potential Compromise for 802.11ah Use Case Document", Institute of Electrical and Electronics Engineers, doc. No. IEEE 802.11-11/0457r0, (Mar. 2011).

Yu, et al. "Coverage extension for IEEE802.11ah," The Institute of Electrical and Electronics Engineers, doc. No. IEEE 802.11-11/0035r1, (Jan. 2011).

Zhang et al., "11ah Data Transmission Flow," The Institute of Electrical and Electronics Engineers, doc. No. IEEE 802.11-11/1484r1, (Nov. 2011).

"IEEE Std. 802.11nTM IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," The Institute of Electrical and Electronics Engineers, Inc., Oct. 2009.

Vermani, et al. "Preamble Format for 1 MHz," The Institute of Electrical and Electronics Engineers, doc. No. IEEE 802.11-11/1482r2, (Nov. 2011).

Zhang et al., "1 MHz Waveform in Wider BW", The Institute of Electrical and Electronics Engineers, doc. No. IEEE 802.11-12/0309r1, (Mar. 2012).

Vermani, et al. "Spec Framework Text for PHY Numerology," The Institute of Electrical and Electronics Engineers, doc. No. IEEE 802.11-11/1311r0, (Sep. 2011).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., (Jun. 12, 2007).

Park, "Proposed Specification Framework for TGah D9.x", The Institute of Electrical and Electronics Engineers, doc. No. IEEE 802.11-yy/xxxxr0, (Jul. 2012).

Shao, "Channel Selection for 802.11ah," doc.: IEEE 802.11-12/0816r0 (Jul. 2012).

International Preliminary Report on Patentability in corresponding PCT Application No. PCT/US2012/063278 dated May 15, 2014.

Park, "Proposed Specification Framework for TGah", The Institute of Electrical and Electronics Engineers, doc. No. IEEE 802.11-11/1137r11, (Sep. 2012).

Taghavi et al., "Introductory Submission for TGah", doc. No. IEEE 802.11-11/0062r0, Institute for Electrical and Electronics Engineers, pp. 1-5 (Jan. 14, 2011).

IEEE Std 802.11ac/D2.0 "Draft Standard for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-359 (Jan. 2012).

IEEE Std 802.11ac/D2.1 "Draft Standard for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-363 (Mar. 2012).

IEEE Std 802.11ac/D3.0 "Draft Standard for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-385 (Jun. 2012).

IEEE Std 802.11ac/D4.0 "Draft Standard for Information Technology-Telecommunications and information exchange between systems-Local and metropolitan area networks-Specific requirements, Part 11: Wireless LAN Medium Access Control (MAC) and Physical

(56) References Cited

OTHER PUBLICATIONS

Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).
IEEE Std 802.11™ 2012 (Revision of IEEE Std 802.Nov. 2007) IEEE Standard for Information technology-Telecommunications and information exchange between systems-Local and metropolitan area networks-Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).
Chen, "Home Network Basis: Transmission Environments and Wired/Wireless Protocols," *Prentice Hall*, pp. 1-26 (Jul. 2003).
Hiertz, et al., "The IEEE 802.11 Universe," *IEEE Communications Magazine*, pp. 62-70, (Jan. 2010).
Park, "Proposed Specification Framework for TGah", *The Institute of Electrical and Electronics Engineers*, doc. No. IEEE 802.11--yy/xxxxr05, (Jan. 2012).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, *Institute for Electrical and Electronics Engineers*, pp. 1-49, (Jan. 18, 2011).
van Nee, et al. "The 802.11n MIMO-OFDM Standard for Wireless LAN and Beyond," Wireless Personal Communications, vol. 37, pp. 445-453 (Jun. 2006).

\* cited by examiner

WLAN TRANSMIT MODES AND COEXISTENCE

CROSS-REFERENCE TO RELATED APPLICATION

This disclosure claims the benefit of U.S. Provisional Patent Application No. 61/554,889, filed on Nov. 2, 2011, the disclosure of which is incorporated herein by reference.

FIELD OF THE DISCLOSURE

The present disclosure relates generally to communication networks and, more particularly, to wireless local area networks that utilize channel aggregation to form wider bandwidth composite channels.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range.

Work has begun on a two new standards, IEEE 802.11ah and IEEE 802.11af, each of which will specify wireless network operation in sub-1 GHz frequencies. Low frequency communication channels are generally characterized by better propagation qualities and extended propagation ranges compared to transmission at higher frequencies. In the past, sub-1 GHz ranges have not been utilized for wireless communication networks because such frequencies were reserved for other applications (e.g., licensed TV frequency bands, radio frequency band, etc.). There are few frequency bands in the sub-1 GHz range that remain unlicensed, with different specific unlicensed frequencies in different geographical regions. The IEEE 802.11ah Standard will specify wireless operation in available unlicensed sub-1 GHz frequency bands. The IEEE 802.11af Standard will specify wireless operation in TV White Space (TVWS), i.e., unused TV channels in sub-1 GHz frequency bands.

SUMMARY

In one embodiment, a method for selecting a primary communication channel for a wireless communication system includes scanning a set of channels, each channel in the set having a first bandwidth, and determining whether one or more channels in the set of channels is not being utilized by one or more other wireless communication systems. The method also includes, when it is determined that one or more channels in the set of channels are not being utilized by one or more other wireless communication systems, selecting a channel from the one or more channels not being utilized as the primary channel for the wireless communication system. Additionally, the method includes, when it is determined that all channels in the set of channels are being utilized by one or more other wireless communication systems, (i) selecting, as the primary channel of the wireless communication system, a channel in the set that is aligned with a primary channel of another wireless communication system, or (ii) selecting, as the primary channel of the wireless communication system, a channel in the set that overlaps with a secondary channel of another wireless communication system, wherein the secondary channel of the other wireless communication system has a bandwidth greater than the first bandwidth.

In other embodiments, the method includes one or more of the following features.

The first bandwidth is equal to 2 MHz.

After selecting the primary channel from the set of channels, selecting a further primary channel having a second bandwidth that is a fraction of the first bandwidth, wherein the further primary channel is selected from a further set of channels that overlap the primary channel, wherein each channel in the further set of channels has a bandwidth equal to the second bandwidth.

Selecting, as the primary channel of the wireless communication system, a channel in the set that is aligned with a primary channel of another wireless communication system includes selecting a channel in the set that overlaps with a primary channel of another wireless communication system, wherein the primary channel of the other wireless communication system has a bandwidth equal to the second bandwidth, and selecting the further primary channel such that the further primary channel is aligned with the primary channel of the other wireless communication system.

The second bandwidth is equal to one half of the first bandwidth, and the further set of channels consists of two non-overlapping channels.

The second bandwidth is equal to 1 MHz.

Selecting, as the primary channel of the wireless communication system, a channel in the set that overlaps with a secondary channel of another wireless communication system, includes when the other wireless communication system is utilizing multiple secondary channels having different bandwidths, each of the different bandwidths greater than the greater than the first bandwidth, selecting the primary channel according to an order of preference corresponding to an ordering of the multiple secondary channels of the other wireless communication system from a widest bandwidth to a smallest bandwidth.

In another embodiment, an apparatus for performing wireless communications comprises a network interface. The network interface is configured to select a primary communication channel for a wireless communication system at least by scanning a set of channels, each channel in the set having a first bandwidth, determining whether one or more channels in the set of channels is not being utilized by one or more other wireless communication systems, when it is determined that one or more channels in the set of channels are not being utilized by one or more other wireless communication systems, selecting a channel from the one or more channels not being utilized as the primary channel for the wireless communication system, and when it is determined that all channels in the set of channels are being utilized by one or more other wireless communication systems, (i) selecting, as the primary channel of the wireless communication system, a channel in the set that is aligned with a primary channel of another wireless communication system, or (ii) selecting, as the primary channel of the wireless communication system, a channel in the set that overlaps with a secondary channel of another wireless communication system, wherein the secondary channel of the other wireless communication system has a bandwidth greater than the first bandwidth.

In other embodiments, the apparatus comprises one or more of the following features.

The first bandwidth is equal to 2 MHz.

The network interface is configured to, after selecting the primary channel from the set of channels, select a further primary channel having a second bandwidth that is a fraction of the first bandwidth, wherein the further primary channel is selected from a further set of channels that overlap the primary channel, wherein each channel in the further set of channels has a bandwidth equal to the second bandwidth.

The network interface is configured to select, as the primary channel of the wireless communication system, a channel in the set that is aligned with a primary channel of another wireless communication system at least by selecting a channel in the set that overlaps with a primary channel of another wireless communication system, wherein the primary channel of the other wireless communication system has a bandwidth equal to the second bandwidth, and selecting the further primary channel such that the further primary channel is aligned with the primary channel of the other wireless communication system.

The second bandwidth is equal to one half of the first bandwidth, and the further set of channels consists of two non-overlapping channels.

The second bandwidth is equal to 1 MHz.

The network interface is configured to select, as the primary channel of the wireless communication system, a channel in the set that overlaps with a secondary channel of another wireless communication system at least by, when the other wireless communication system is utilizing multiple secondary channels having different bandwidths, each of the different bandwidths greater than the greater than the first bandwidth, selecting the primary channel according to an order of preference corresponding to an ordering of the multiple secondary channels of the other wireless communication system from a widest bandwidth to a smallest bandwidth.

In yet another embodiment, a method for selecting a primary communication channel for a wireless communication system includes scanning a set of channels, each channel in the set having a first bandwidth, and determining whether one or more channels in the set of channels is not being utilized by one or more other wireless communication systems. Also, the method includes when it is determined that one or more channels in the set of channels are not being utilized by one or more other wireless communication systems, selecting a channel from the one or more channels not being utilized as the primary channel for the wireless communication system. The method additionally includes, when it is determined that all channels in the set of channels are being utilized by one or more other wireless communication systems, (i) selecting, as the primary channel of the wireless communication system, a channel in the set that is aligned with a primary channel of another wireless communication system, or (ii) selecting, as the primary channel of the wireless communication system, a channel in the set that overlaps with a secondary channel of another wireless communication system, wherein the secondary channel of the other wireless communication system has a bandwidth greater than the first bandwidth.

In other embodiments, the method includes one or more of the following features.

The first bandwidth is equal to 1 MHz.

Selecting, as the primary channel of the wireless communication system, a channel in the set that is aligned with a primary channel of another wireless communication system, includes selecting a channel in the set that (i) overlaps with a first primary channel of another wireless communication system, wherein the first primary channel of the other wireless communication system has a bandwidth equal to a second bandwidth greater than the first bandwidth, and (ii) is aligned with a second primary channel of the other wireless communication system, wherein the second primary channel of the other wireless communication system has a bandwidth equal to the first bandwidth.

The second bandwidth is equal to twice the first bandwidth, and the first primary channel of the other wireless communication system consists of two non-overlapping channels each having a bandwidth equal to the first bandwidth.

The second bandwidth is equal to 2 MHz.

Selecting, as the primary channel of the wireless communication system, a channel in the set that overlaps with a secondary channel of another wireless communication system includes, when the other wireless communication system is utilizing multiple secondary channels having different bandwidths, each of the different bandwidths greater than the greater than the first bandwidth, selecting the primary channel according to an order of preference corresponding to an ordering of the multiple secondary channels of the other wireless communication system from a widest bandwidth to a smallest bandwidth.

Each channel in the set of channels is adjacent to at least one other channel in the set of channels.

Channels in the set of channels are spaced apart from each other by at least the first bandwidth.

In still another embodiment, an apparatus for performing wireless communications comprises a network interface. The network interface is configured to select a primary communication channel for a wireless communication system at least by scanning a set of channels, each channel in the set having a first bandwidth, determining whether one or more channels in the set of channels is not being utilized by one or more other wireless communication systems, when it is determined that one or more channels in the set of channels are not being utilized by one or more other wireless communication systems, selecting a channel from the one or more channels not being utilized as the primary channel for the wireless communication system, and when it is determined that all channels in the set of channels are being utilized by one or more other wireless communication systems, (i) selecting, as the primary channel of the wireless communication system, a channel in the set that is aligned with a primary channel of another wireless communication system, or (ii) selecting, as the primary channel of the wireless communication system, a channel in the set that overlaps with a secondary channel of another wireless communication system, wherein the secondary channel of the other wireless communication system has a bandwidth greater than the first bandwidth.

In other embodiments, the apparatus includes one or more of the following features.

The first bandwidth is equal to 1 MHz.

The network interface is configured to select, as the primary channel of the wireless communication system, a channel in the set that is aligned with a primary channel of another wireless communication system at least by selecting a channel in the set that (i) overlaps with a first primary channel of another wireless communication system, wherein the first primary channel of the other wireless communication system has a bandwidth equal to a second bandwidth greater than the first bandwidth, and (ii) is aligned with a second primary channel of the other wireless communication system, wherein the second primary channel of the other wireless communication system has a bandwidth equal to the first bandwidth.

The second bandwidth is equal to twice the first bandwidth, and the first primary channel of the other wireless communication system consists of two non-overlapping channels each having a bandwidth equal to the first bandwidth.

The second bandwidth is equal to 2 MHz.

The network interface is configured to select, as the primary channel of the wireless communication system, a channel in the set that overlaps with a secondary channel of another wireless communication system at least by, when the other wireless communication system is utilizing multiple secondary channels having different bandwidths, each of the different bandwidths greater than the greater than the first bandwidth, selecting the primary channel according to an order of preference corresponding to an ordering of the multiple secondary channels of the other wireless communication system from a widest bandwidth to a smallest bandwidth.

Each channel in the set of channels is adjacent to at least one other channel in the set of channels.

Channels in the set of channels are spaced apart from each other by at least the first bandwidth.

DETAILED DESCRIPTION

In embodiments described below, a wireless network device such as an access point (AP) of a wireless local area network (WLAN) transmits data streams to one or more client stations. The AP is configured to operate with client stations according to at least a first communication protocol. The first communication protocol defines operation in a sub-1 GHz frequency range, and is typically used for applications requiring long range wireless communication with relatively low data rates. The first communication protocol (e.g., the IEEE 802.11ah Standard) is referred to herein as a "long range" communication protocol.

In some embodiments, the long range communication protocol defines a set of channels that can be used, and an access point (AP) scans the channels to find unused channels that are available for use by the AP. In some embodiments, each channel in the set of channels has a bandwidth of 1 MHz. In other embodiments, each channel in the set of channels has a bandwidth of 2 MHz. In some embodiments in which each channel in the set of channels has a bandwidth of 2 MHz, a first portion of a channel can be used as narrower bandwidth channel, and a second portion of the channel can remain unused. For example, in some embodiments in which each channel in the set of channels has a bandwidth of 2 MHz, a first 1 MHz wide portion of a channel can be used as narrower bandwidth channel, and a second 1 MHz wide portion of the channel can remain unused. In other embodiments, each channel in the set of channels has a suitable bandwidth other than 1 MHz or 2 MHz.

In some embodiments, the long range communication protocol permits stations to aggregate multiple channels into a wider bandwidth, composite channel. For example, in some embodiments in which each channel in the set of channels has a bandwidth of 2 MHz, composite channels having a bandwidth 4 MHz can be utilized. In some embodiments in which each channel in the set of channels has a bandwidth of 2 MHz, one or both of (i) composite channels having a bandwidth of 8 MHz, or (ii) composite channels having a bandwidth of 16 MHz can be utilized. In some embodiments in which each channel in the set of channels has a bandwidth of 1 MHz, composite channels having a bandwidth 2 MHz can be utilized. In some embodiments in which each channel in the set of channels has a bandwidth of 1 MHz, one or more of (i) composite channels having a bandwidth of 4 MHz, (ii) composite channels having a bandwidth of 8 MHz, or (iii) composite channels having a bandwidth of 16 MHz can be utilized.

Figure 1:
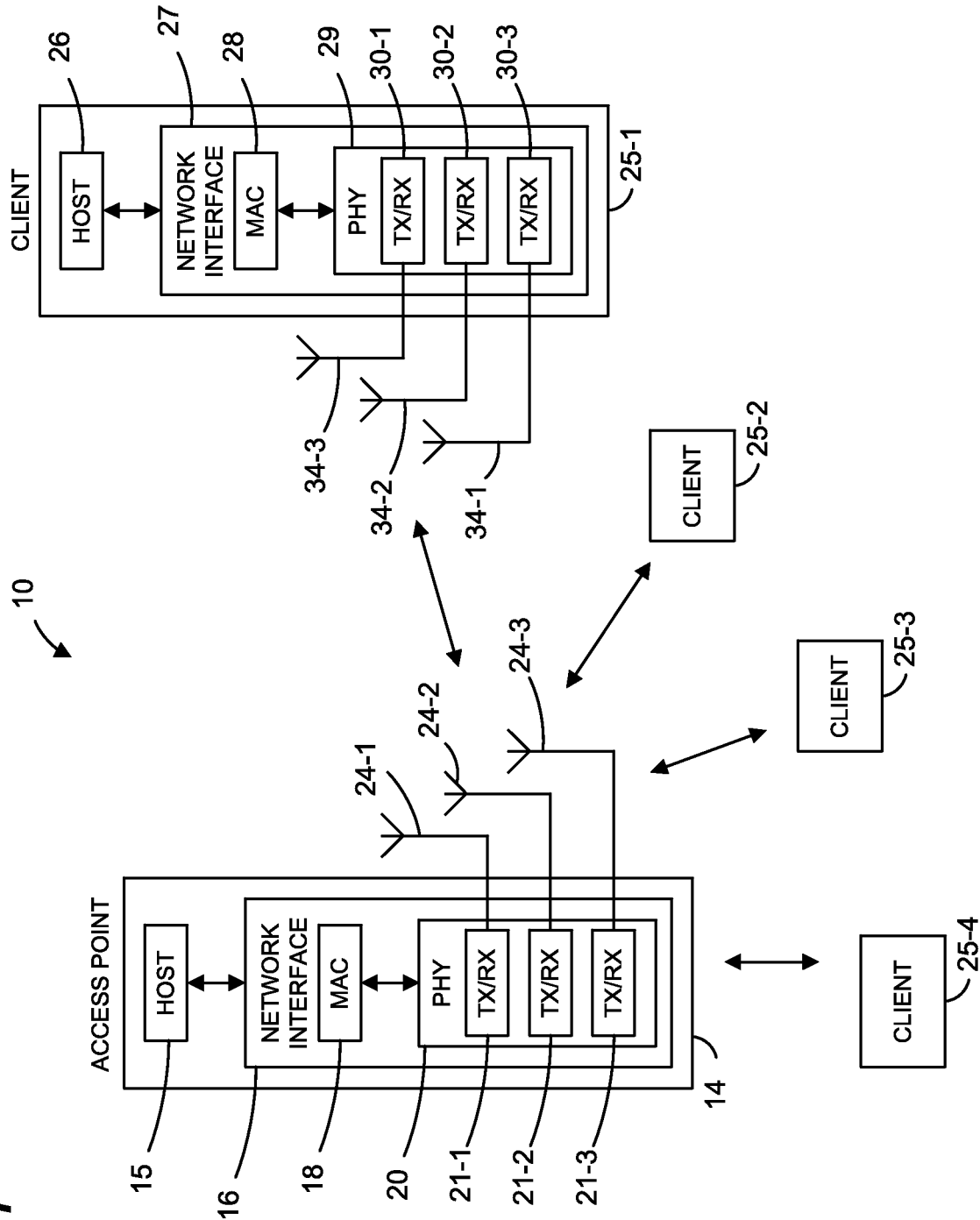
FIG. 1 is a block diagram of an example wireless local area network (WLAN) that utilizes techniques disclosed herein, according to an embodiment.

FIG. 1 is a block diagram of an example WLAN 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the long range communication protocol.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In some embodiments, one, some, or all of the client stations 25-2, 25-3, and 25-4 has/have a structure the same as or similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the PHY processing unit 20 of the AP 14 is configured to generate data units conforming to the long range communication protocol. The transceiver(s) 21 is/are configured to transmit the generated data units via the antenna(s) 24. Similarly, the transceiver(s) 21 is/are configured to receive data units via the antenna(s) 24. The PHY processing unit 20 of the AP 14 is also configured to process received data units conforming to the long range communication protocol.

In various embodiments, the PHY processing unit 29 of the client device 25-1 is configured to generate data units conforming to the long range communication protocol. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is also configured to process received data units conforming to the long range communication protocol.

Figure 2:
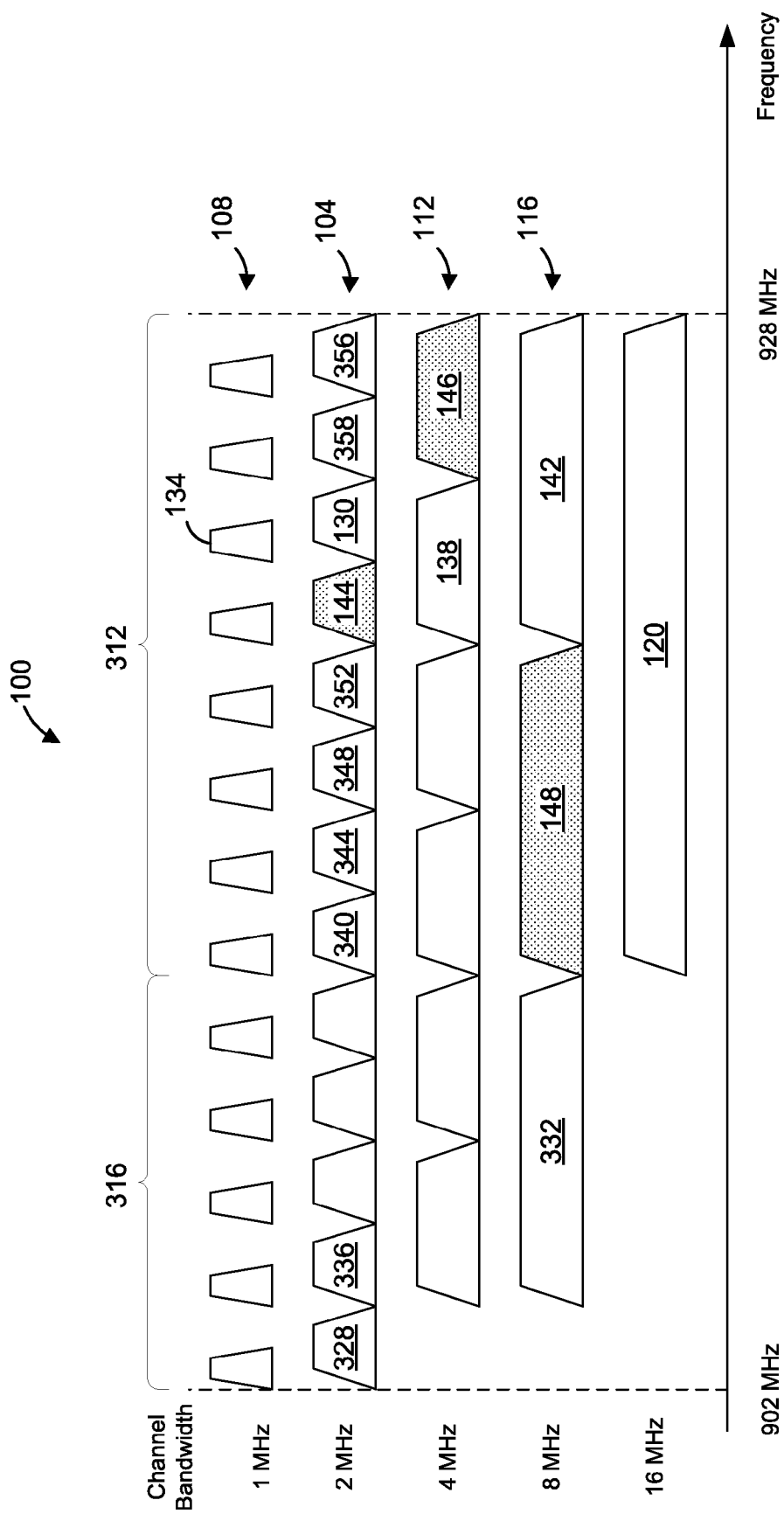
FIG. 2 is a diagram of an example channelization scheme, according to an embodiment.

FIG. 2 is a diagram of a channelization scheme 100 defined by the long range communication protocol, according to an embodiment. FIG. 2 will be described with reference to the WLAN 10 of FIG. 1 for explanatory purposes. In some embodiments, however, the channelization scheme 100 is utilized with other suitable networks.

The channelization scheme 100 defines a plurality of unit channels 104 (e.g., 13 channels or another suitable number of channels) in a sub 1 GHz band (e.g., between 902 MHz and 928 MHz or some other suitable band). The channelization scheme 100 is suitable for use in the United States, for example. In other countries, other similar suitable channelization schemes are utilized, having a different suitable number of channels, within a different suitable band, etc., according to some embodiments.

The plurality of unit channels 104 are adjacent and non-overlapping, and each unit channel 104 has a bandwidth of 2 MHz, in an embodiment. The AP 14 (e.g., the network interface 16) is configured to scan the plurality of unit channels 104 to determine unit channels 104 that are busy, e.g., unit channels 104 on at least a portion of which there are communications. The AP 14 (e.g., the network interface 16) is configured to select one of the unit channels 104 as a primary channel for the AP 14 based on the scan of the plurality of unit channels 104.

In some embodiments, after a primary channel is selected, the AP 14 (e.g., the network interface 16) and/or the client station 25 (e.g., the network interface 27) is configured to operate on only a portion of the selected primary channel, at least in some scenarios. For example, the AP 14 (e.g., the network interface 16) and/or the client station 25 (e.g., the network interface 27) is configured to operate on one of a plurality of sub-unit channels 108 that overlaps the primary channel, at least in some scenarios. In an embodiment, each sub-unit channel 108 has a bandwidth of 1 MHz. In an embodiment, a lower (in frequency) edge of each sub-unit channel 108 is aligned with a lower (in frequency) edge of the channel 104 with which the sub-unit channel 108 overlaps. In another embodiment, an upper (in frequency) edge of each sub-unit channel 108 is aligned with an upper (in frequency) edge of the channel 104 with which the sub-unit channel 108 overlaps. In an embodiment, the AP 14 is configured to select, based on channel conditions, either a sub-unit channel with an upper edge aligned with the upper edge of the primary channel or a sub-unit channel with a lower edge aligned with the lower edge of the primary channel.

In some embodiments, after a primary channel is selected, the AP 14 (e.g., the network interface 16) and/or the client station 25 (e.g., the network interface 27) is configured to aggregate multiple unit channels 104 into a composite channel. For example, in an embodiment, two unit channels 104 can be aggregated to form 4 MHz-wide composite channels 112. The plurality of composite channels 112 are adjacent and non-overlapping, in an embodiment. In an embodiment, an upper (in frequency) edge of the plurality of composite channels 112 is aligned with an upper (in frequency) edge of the plurality of unit channels 104. In another embodiment, a lower (in frequency) edge of the plurality of composite channels 112 is aligned with a lower (in frequency) edge of the plurality of unit channels 104.

In an embodiment, four primary channels 104 can be aggregated to form 8 MHz-wide composite channels 116. The plurality of composite channels 116 are adjacent and non-overlapping, in an embodiment. In an embodiment, an upper (in frequency) edge of the plurality of composite channels 116 is aligned with an upper (in frequency) edge of the plurality of unit channels 104. In another embodiment, a lower (in frequency) edge of the plurality of composite channels 116 is aligned with a lower (in frequency) edge of the plurality of unit channels 104.

In an embodiment, eight primary channels 104 can be aggregated to form a 16 MHz-wide composite channel 120. If multiple composite channels 112 are able to fit within the band of unit channels 104, the multiple composite channels 112 are adjacent and non-overlapping, in an embodiment. In an embodiment, an upper (in frequency) edge of the composite channel(s) 120 is aligned with an upper (in frequency) edge of the plurality of unit channels 104. In another embodiment, a lower (in frequency) edge of the composite channel(s) 120 is aligned with a lower (in frequency) edge of the plurality of unit channels 104.

In some embodiments, the sub-unit channel and the composite channels that are available for use, at least potentially, are determined by the selection of the primary channel. For example, if the unit channel 130 is selected as the primary channel, the sub-unit channel 134 is available for use because, of the sub-unit channels 108, only the sub-unit channel 134 overlaps in frequency with the primary channel 130. Similarly, if the unit channel 130 is selected as the primary channel, the composite channels 120, 138, and 142 are potentially available for use because, of the composite channels 112, 116, and 120, only the composite channels 120, 138, and 142 overlap with the primary channel 130.

Composite channels 112 are sometimes referred to as 4 MHz primary channels 112. Similarly, composite channels 116 are sometimes referred to as 8 MHz primary channels 116. Similarly, composite channel(s) 120 are sometimes referred to as 16 MHz primary channel(s) 120. A composite channel can be said to be formed from two smaller channels including a smaller primary channel and a secondary channel adjacent to the smaller primary channel. For example, the primary channel 138 is formed from the 2 MHz primary channel 120 and a 2 MHz secondary channel 144. As another example, the primary channel 142 is formed from the 4 MHz primary channel 138 and a 4 MHz secondary channel 146. As another example, the primary channel 120 is formed from the 8 MHz primary channel 142 and an 8 MHz secondary channel 148.

Figure 3:
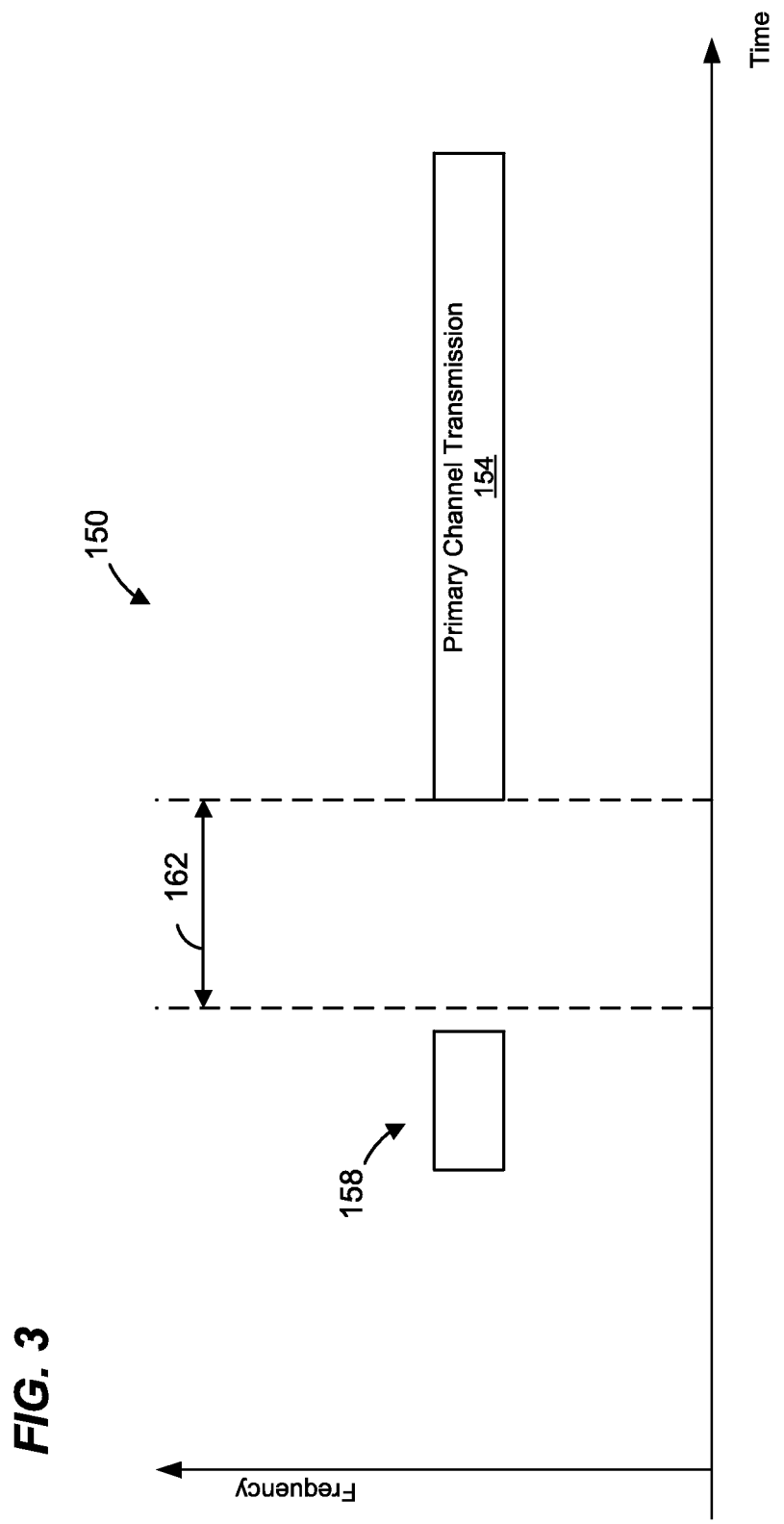
FIG. 3 is a diagram of a transmission on a primary channel occurring after interfering signals have stopped, according to an embodiment.

FIG. 3 is a diagram 150 of an example transmission in a communication system utilizing a channelization scheme such as described above with respect to FIG. 2, according to an embodiment. In the example illustrated in FIG. 2, a transmission 154 is transmitted via a primary channel. The transmission 154 is generated and transmitted by an AP such as the AP 14 (FIG. 1), or a client device, such as the client 25-1 (FIG. 1).

Interference 158 is present in the primary channel. The interference 158 corresponds to transmissions of another communication system, for example, such as a basic service set (BSS) different than a BSS to which the transmission 154 corresponds, in some scenarios. As an example, the interference 158 is transmitted by or to an AP of another communication system.

In some embodiments, the transmission 154 in the primary channel is allowed if it is determined that the primary channel is idle. Determining whether a channel is idle comprises determining if the channel is idle for at least a particular period of time, in some embodiments. In some embodiments, the particular period of time varies depending on the type of channel.

It is determined whether the primary channel is idle for at least for a time period 162, and in the example illustrated in FIG. 3, the primary channel was idle for at least the time period 162.

In some embodiments and/or scenarios, the time period 162 is, or is based on a suitable defined and/or determined fixed time period such as the arbitration interframe space (AIFS), the point coordination function (PCF) interframe space (PIFS), or the distributed coordination function (DCF) interframe space (DIFS) described in the IEEE 802.11 Standard. For example, in an embodiment, the time period 162 is determined as a sum of (i) the fixed time period and (ii) a suitable additional time period such as a back-off time period. In an embodiment, the back-off time period is a randomly generated time period such as described in the IEEE 802.11 Standard. In an embodiment, the fixed time period is AIFS. As used herein, the term "randomly generated time period" encompasses pseudo-randomly generated time periods.

In an embodiment, determining whether the primary channel is idle includes determining a signal level in the primary channel (primary signal level) and comparing the primary signal level to a threshold. Thus, in an embodiment, the primary signal level is measured using a suitable signal measurement technique. In an embodiment, an energy level in the primary channel is measured, at least in scenarios in which the signal in the primary channel cannot be decoded. As another example, in scenarios in which the signal in the primary channel can be determined to be a valid signal, a level of the signal is measured at least over a preamble of the signal or some other suitable portion of the signal, in an embodiment. In an embodiment, two primary signal level measurements are made when the signal in the primary channel can be determined to be a valid signal.

In an embodiment, determining if the primary channel is idle includes determining whether there is a valid signal in the primary channel. For example, it may be determined whether there is a signal in the primary channel that conforms to the long range communication protocol or a short range communication protocol (e.g., the IEEE 802.11a Standard, the IEEE 802.11g Standard, the IEEE 802.11n Standard, the IEEE 802.11ac Standard, etc.). A suitable technique for determining if there is a valid signal in the primary channel is utilized.

In some embodiments, determining whether the primary channel is idle is based on the measured primary signal level and the determination of whether there is a valid signal in the primary channel. In an embodiment, a primary signal level measurement is compared to a first threshold, and determining that the primary channel is idle is based on the comparison. For example, when the primary signal level measurement meets (e.g., exceeds) the first threshold, it is determined that the primary channel is not idle (i.e., busy). In an embodiment, determining whether the primary channel is idle includes comparing a primary signal level measurement to a second threshold, and determining that the primary channel is idle based on the comparison, at least when it is determined that there is a valid signal in the primary channel. For example, when there is a valid signal in the primary channel and when the primary signal level measurement meets (e.g., exceeds) the second threshold, it is determined that the primary channel is busy (i.e., not idle). In an embodiment, the second threshold is lower than or equal to the first threshold.

In some scenarios, i) comparing a primary signal level measurement to the first threshold and ii) comparing a primary signal level measurement to the second threshold are not both performed. For example, if no valid signal is detected in the primary channel, comparing a primary signal level measurement to the second threshold is not performed, in an embodiment. As another example, if comparing a primary signal level measurement to the first threshold results in determining that the primary channel is busy, comparing a primary signal level measurement to the second threshold is not performed, in an embodiment. Similarly, as another example, if comparing a primary signal level measurement to the second threshold results in determining that the primary channel is busy, comparing a primary signal level measurement to the first threshold is not performed, in an embodiment.

As discussed above with respect to FIG. 2, transmissions in a sub-unit channel 108 are permitted in some embodiments. In some embodiments, transmission in a sub-unit channel 108 is allowed if it is determined that the corresponding primary channel 104 (i.e., the sub-unit channel 108 overlaps with the primary channel 104) is idle.

Figure 4:
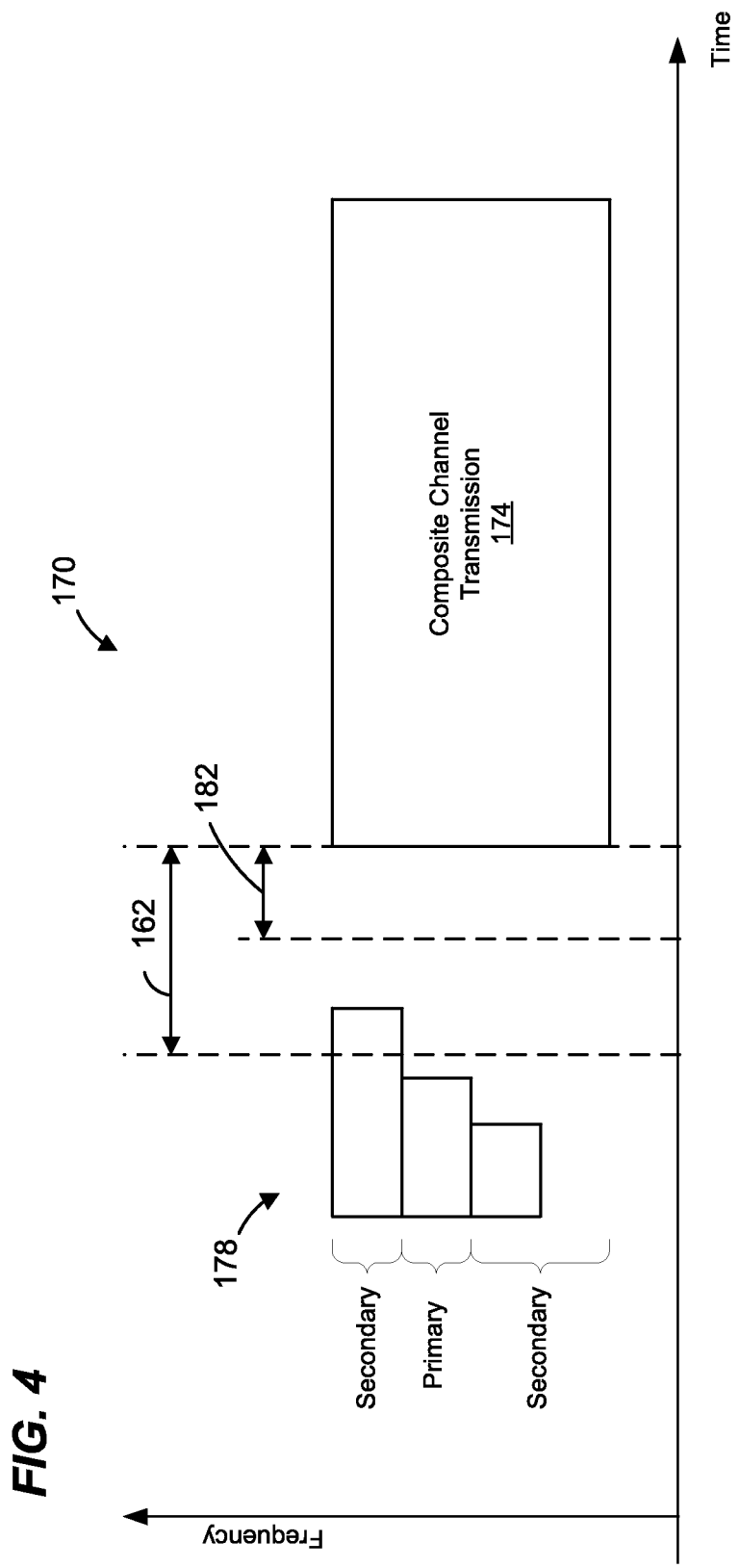
FIG. 4 is a diagram of a transmission on a composite channel occurring after interfering signals have stopped, according to an embodiment.

When a station attempts to transmit via a composite channel that includes the primary channel, the station first determines whether the primary channel and secondary channels to be used in the composite channel are idle. FIG. 4 is a diagram 170 of an example transmission in a communication system utilizing a channelization scheme such as described above with respect to FIG. 2, according to an embodiment. In the example illustrated in FIG. 3, a transmission 174 is transmitted via a composite channel. The transmission 174 is generated and transmitted by an AP such as the AP 14 (FIG. 1), or a client device, such as the client 25-1 (FIG. 1).

Interference 178 is present in the composite channel. The interference 178 corresponds to transmissions of one or more other communication systems, for example, such as a BSS different than the BSS to which the transmission 174 corresponds, in some scenarios. As an example, the interference 178 includes signals transmitted by or to one or more APs of one or more other communication systems.

In some embodiments, the transmission 174 in the composite channel is allowed if it is determined that the primary channel and secondary channels to be used in the composite channel are idle. Determining whether a channel is idle comprises determining if the channel is idle for at least a particular period of time, in some embodiments. In some embodiments, the particular period of time varies depending on the type of channel. For example, it is determined whether the primary channel is idle for at least the time period 162 (discussed above with respect to FIG. 3), whereas it is determined whether secondary channels are idle for at least a time period 182, in an embodiment. The time period 182 is a suitable fixed time period such as discussed above, e.g., AIFS, PIFS, DIFS, etc. In an embodiment, the time period 182 is PIFS, whereas the time period 162 is AIFS plus a randomly generated back-off time period as discussed above. In some embodiments, determining whether a channel is idle comprises using one or more of the idle-detection techniques discussed above. In an embodiment, determining whether a secondary channel is idle additionally or alternatively comprises using a suitable mid-packet detection technique. In an embodiment, determining whether a secondary channel is idle includes utilizing suitable techniques capable of detecting a 1 MHz transmission in the secondary channel at a suitable signal strength.

Figure 5:
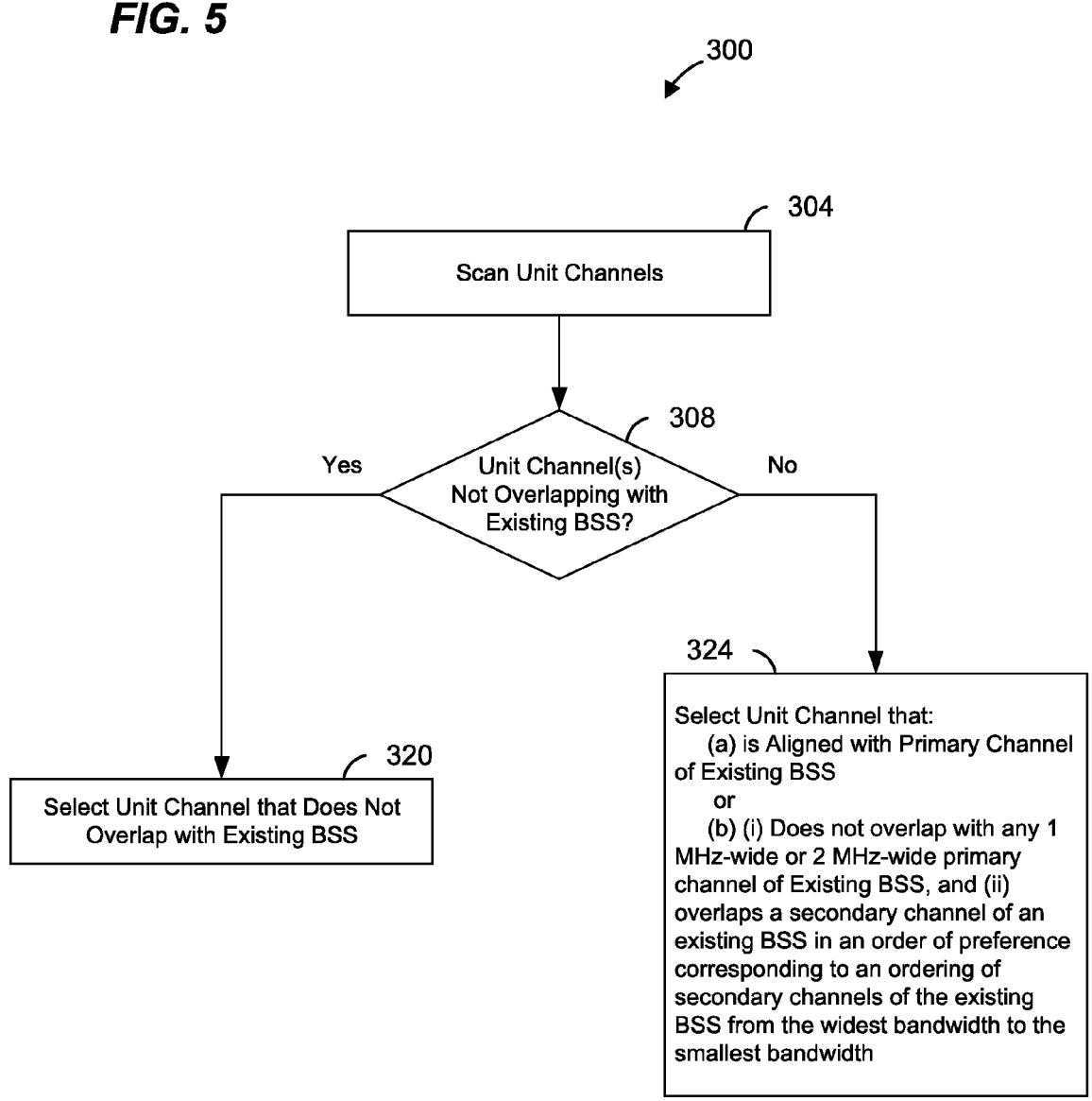
FIG. 5 is a flow diagram of an example method for selecting a primary channel, according to an embodiment.

FIG. 5 is a flow diagram of an example method 300 for selecting a primary channel for a wireless communication network. In an embodiment, the method 300 is utilized with a channelization scheme such as described above with respect to FIG. 2, and the method 300 will be discussed with reference to FIG. 2 for explanatory purposes. In other embodiments, the method 300 is utilized with another suitable channelization scheme. In an embodiment, the network interface 16 of the AP 14 of FIG. 1 is configured to implement the method 300. In other embodiments, the method 300 is implemented by another suitable communication device.

At block 304, a set of unit channels is scanned to determine which unit channels are idle, if any. For example, in the example channelization scheme 100, the unit channels 104 are scanned. At block 308, it is determined whether there are any unit channels that are not overlapping with channels used by an existing BSS based on the scan performed at block 304. In FIG. 2, for example, it is determined that an existing BSS is utilizing the composite channel 120 and thus a set of unit channels 312 is not idle, but that the set of unit channels 316 is idle and not overlapping with an existing BSS.

If it is determined at block 308 that there are unit channels not overlapping with an existing BSS, the flow proceeds to block 320. At block 320, one of the unit channels that are not overlapping with an existing BSS is selected as the primary channel.

On the other hand, if it is determined at block 308 that there are no unit channels that are not overlapping with an existing BSS, the flow proceeds to block 324. For example, if it is determined that the composite channel 120, the unit channel 328, and the composite channel 332 (with primary channel 336) are being utilized by existing BSSs, then there are no unit channels 104 that do not overlap with an existing BSS.

At block 324, a unit channel is selected as the primary channel such that (a) the selected unit channel is aligned with a primary channel of an existing BSS, or (b) the selected unit channel (i) does not overlap with any 1 MHz-wide or 2 MHz-wide primary channel of an existing BSS, and (ii) is chosen to overlap a secondary channel of an existing BSS in an order of preference corresponding to an ordering of secondary channels of the existing BSS from the widest bandwidth to the smallest bandwidth, according to an embodiment. For example, if unit channel 328, composite channel 332, and composite channel 120 are all being utilized by existing BSSs, then there are no unit channels 104 that are not overlapping with an existing BSS. Thus, in one scenario, a unit channel is selected as the primary channel of a new BSS such that the selected unit channel is aligned with the primary channel 130 of an existing BSS. In another scenario, one of unit channels 340, 344, 348, 352, 356, 358, and 144 is selected as the primary channel of a new BSS. The order of preference for selection in the example illustrated in FIG. 2 is: (i) overlap with 8 MHz secondary channel 148 (e.g., one of unit channels 340, 344, 348, and 352); (ii) overlap with 4 MHz secondary channel 146 (e.g., one of unit channels 356 and 358); and (iii) overlap with 2 MHz secondary channel 144.

In an embodiment, when the primary channel is selected according to (b) above, a unit channel is selected such that the number of composite channels of the existing BSS that are overlapped is minimized. Thus, in an embodiment and in the example scenario discussed above, one of unit channels 340, 344, 348, and 352 is selected as the primary channel of the new BSS, i.e., the unit channel 356 is not selected because the unit channel 356 overlaps with both the composite channel 120 and the composite channel 142, whereas the unit channels 340, 344, 348, and 352 only overlap with the composite channel 120.

Figure 6:
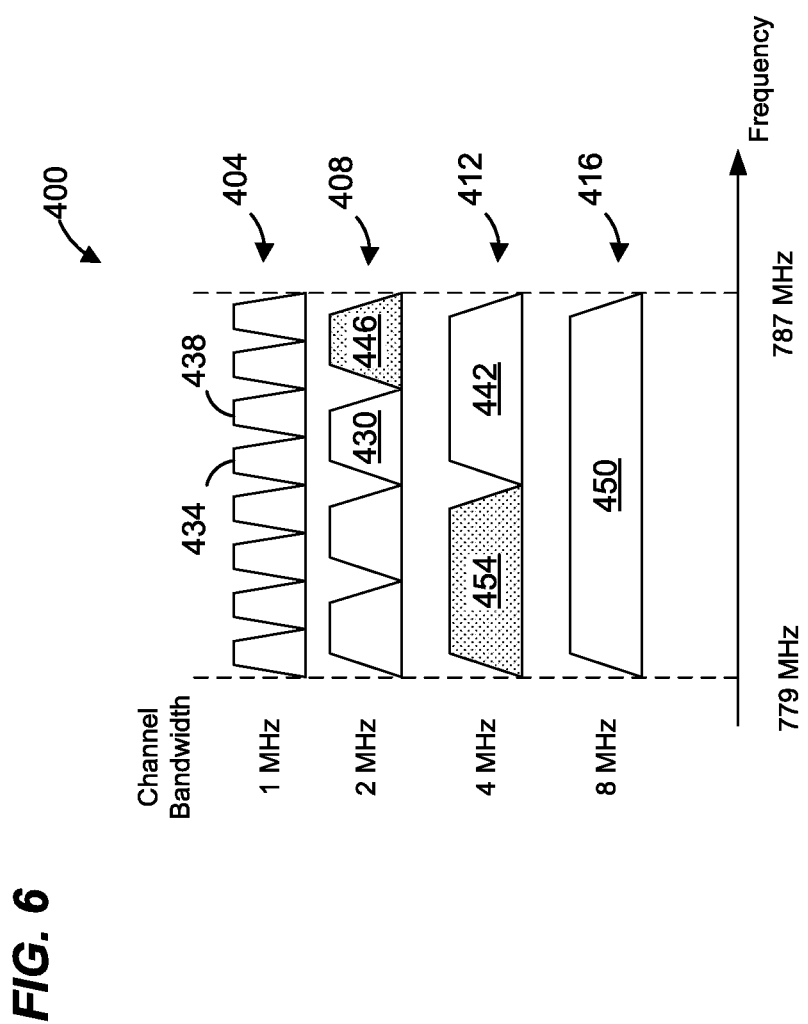
FIG. 6 is a diagram of another example channelization scheme, according to an embodiment.

FIG. 6 is a diagram of a channelization scheme 400 defined by the long range communication protocol, according to an embodiment. FIG. 4 will be described with reference to the WLAN 10 of FIG. 1 for explanatory purposes. In some embodiments, however, the channelization scheme 400 is utilized with other suitable networks.

The channelization scheme 400 defines a plurality of unit channels 404 (e.g., 8 channels or another suitable number of channels) in a sub 1 GHz band (e.g., between 779 MHz and 787 MHz or some other suitable band). The channelization scheme 400 is suitable for use in China, for example. In other countries, other similar suitable channelization schemes are utilized, having a different suitable number of channels, within a different suitable band, etc., according to some embodiments.

The plurality of unit channels 404 are adjacent and non-overlapping, and each unit channel 404 has a bandwidth of 1 MHz, in an embodiment. The AP 14 (e.g., the network interface 16) is configured to scan the plurality of unit channels 404 to determine unit channels 404 that are busy, e.g., unit channels 404 on at least a portion of which there are communications. The AP 14 (e.g., the network interface 16) is configured to select one of the unit channels 404 as a primary channel for the AP 14 based on the scan of the plurality of unit channels 404.

In some embodiments, after a primary channel is selected, the AP 14 (e.g., the network interface 16) and/or the client station 25 (e.g., the network interface 27) is configured to aggregate multiple unit channels 404 into a composite channel. For example, in an embodiment, two unit channels 404 can be aggregated to form 2 MHz-wide composite channels 408. The plurality of composite channels 408 are adjacent and non-overlapping, in an embodiment. In an embodiment, an upper (in frequency) edge of the plurality of composite channels 408 is aligned with an upper (in frequency) edge of the plurality of unit channels 404. In another embodiment, a lower (in frequency) edge of the plurality of composite channels 408 is aligned with a lower (in frequency) edge of the plurality of unit channels 408. In an embodiment, the upper (in frequency) edge of the plurality of composite channels 408 is aligned with the upper (in frequency) edge of the plurality of unit channels 404, and the lower (in frequency) edge of the plurality of composite channels 408 is aligned with the lower (in frequency) edge of the plurality of unit channels 404.

In an embodiment, four unit channels 404 can be aggregated to form 4 MHz-wide composite channels 412. The plurality of composite channels 112 are adjacent and non-overlapping, in an embodiment. In an embodiment, an upper (in frequency) edge of the plurality of composite channels 412 is aligned with an upper (in frequency) edge of the plurality of unit channels 404. In another embodiment, a lower (in frequency) edge of the plurality of composite channels 412 is aligned with a lower (in frequency) edge of the plurality of unit channels 404. In an embodiment, the upper (in frequency) edge of the plurality of composite channels 412 is aligned with the upper (in frequency) edge of the plurality of unit channels 404, and the lower (in frequency) edge of the plurality of composite channels 412 is aligned with the lower (in frequency) edge of the plurality of unit channels 404.

In an embodiment, eight primary channels 404 can be aggregated to form one or more 8 MHz-wide composite channels 416. Although only one 8 MHz-wide composite channel 416 is possible in the example channelization of FIG. 6, in other embodiments with a high number of unit channels 404 (e.g., 16 or more), multiple 8 MHz-wide composite channel 416 are available. The one or more composite channels 416 are adjacent and non-overlapping, in an embodiment. In an embodiment, an upper (in frequency) edge of the one or more composite channels 416 is aligned with an upper (in frequency) edge of the plurality of unit channels 104. In another embodiment, a lower (in frequency) edge of the one or more composite channels 116 is aligned with a lower (in frequency) edge of the plurality of unit channels 104. In an embodiment, the upper (in frequency) edge of the one or more composite channels 416 is aligned with the upper (in frequency) edge of the plurality of unit channels 404, and the lower (in frequency) edge of the one or more composite channels 416 is aligned with the lower (in frequency) edge of the plurality of unit channels 404.

In an embodiment, sixteen primary channels 104 can be aggregated to form a 16 MHz-wide composite channel (not shown). For example, in other embodiments with a high number of unit channels 404 (e.g., 16 or more), one or more 16 MHz-wide composite channel are available. If multiple 16 MHz-wide composite channels are able to fit within the band of unit channels 404, the multiple 16 MHz-wide composite channels are adjacent and non-overlapping, in an embodiment. In an embodiment, an upper (in frequency) edge of the 16 MHz-wide composite channel(s) is aligned with an upper (in frequency) edge of the plurality of unit channels 404. In another embodiment, a lower (in frequency) edge of the 16 MHz-wide composite channel(s) is aligned with a lower (in frequency) edge of the plurality of unit channels 404. In an embodiment, the upper (in frequency) edge of the one or more 16 MHz-wide composite channels are aligned with the upper (in frequency) edge of the plurality of unit channels 404, and the lower (in frequency) edge of the one or more 16 MHz-wide composite channels are aligned with the lower (in frequency) edge of the plurality of unit channels 404.

Composite channels 408 are sometimes referred to as 2 MHz primary channels 408. Similarly, composite channels 412 are sometimes referred to as 4 MHz primary channels 412. Similarly, composite channels 416 are sometimes referred to as 8 MHz primary channels 416. A composite channel can be said to be formed from two smaller channels including a smaller primary channel and a secondary channel adjacent to the smaller primary channel. For example, a 2 MHz primary channel 430 is formed from a 1 MHz primary channel 434 and a 1 MHz secondary channel 438. As another example, a 4 MHz primary channel 442 is formed from the 2 MHz primary channel 430 and a 2 MHz secondary channel 446. As another example, an 8 MHz primary channel 450 is formed from the 4 MHz primary channel 442 and a 4 MHz secondary channel 454.

Figure 7:
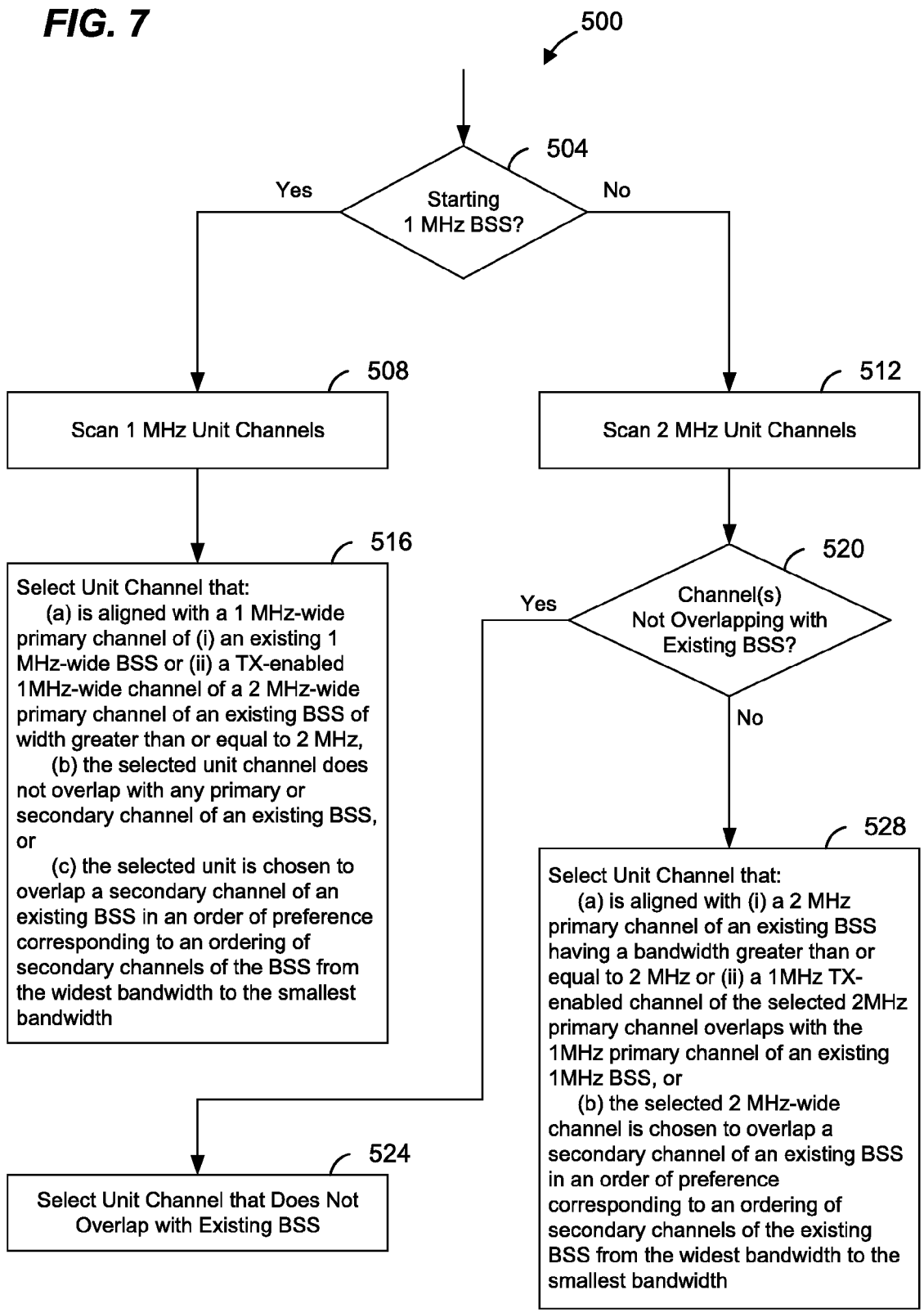
FIG. 7 is a flow diagram of another example method for selecting a primary channel, according to an embodiment.

FIG. 7 is a flow diagram of an example method 500 for selecting a primary channel for a wireless communication network. In an embodiment, the method 500 is utilized with a channelization scheme such as described above with respect to FIG. 6, and the method 500 will be discussed with reference to FIG. 6 for explanatory purposes. In other embodiments, the method 500 is utilized with another suitable channelization scheme. In an embodiment, the network interface 16 of the AP 14 of FIG. 1 is configured to implement the method 500. In other embodiments, the method 500 is implemented by another suitable communication device.

At block 504, it is determined whether a new BSS will utilize a 1 MHz wide channel. If the new BSS will utilize a 1 MHz wide channel, the flow proceeds to block 508. On the other hand, if the new BSS will utilize a channel having a width greater than 1 MHz, the flow proceeds to block 512. In some embodiments, block 504 is omitted. For example, when a communication device (e.g., the network interface 16 of the AP 14) is configured to only utilize 1 MHz wide channels, then the method commences at block 508, according to an embodiment. Similarly, when a communication device (e.g., the network interface 16 of the AP 14) is configured to only utilize channels having a bandwidth greater than 1 MHz, then the method commences at block 512.

At block 508, a set of 1 MHz-wide channels is scanned to determine which, if any, channels are already primary channels of other BSSs. For example, in the example channelization scheme 400, the unit channels 404 are scanned.

At block 516, a 1-MHz wide unit channel is selected as the primary channel such that (a) the selected unit channel is aligned with (i) a 1 MHz-wide primary channel of an existing 1 MHz-wide BSS or (ii) a TX-enabled 1 MHz-wide channel of a 2 MHz-wide primary channel of an existing BSS of width greater than or equal to 2 MHz, (b) the selected unit channel does not overlap with any primary or secondary channel of an existing BSS, or (c) the selected unit is chosen to overlap a secondary channel of an existing BSS in an order of preference corresponding to an ordering of secondary channels of the BSS from the widest bandwidth to the smallest bandwidth, according to an embodiment.

As discussed above, when the new BSS will utilize a channel having a width greater than 1 MHz, the flow proceeds to block 512. At block 512, a set of 2 MHz-wide channels is scanned to determine which unit channels are idle, if any. For example, in the example channelization scheme 400, the unit channels 408 are scanned.

At block 520, it is determined whether there are any 2 MHz-wide channels that are not overlapping with an existing BSS based on the scan performed at block 512.

If it is determined at block 520 that there are 2 MHz-wide channels not overlapping with an existing BSS, the flow proceeds to block 524. At block 524, one of the 2 MHz-wide channels that is not overlapping with an existing BSS is selected as the 2 MHz-wide primary channel. Additionally, a 1 MHz-wide channel is selected as a 1 MHz primary channel (or 1 MHz TX-enabled channel). In an embodiment, the 1 MHz-wide channel is selected as either an upper 1 MHz-wide portion of the 2 MHz-wide primary channel or a lower 1 MHz-wide portion of the 2 MHz-wide primary channel.

On the other hand, if it is determined at block 520 that there are no 2 MHz-wide channels that are not overlapping with an existing BSS, the flow proceeds to block 528.

At block 528, a 2 MHz-wide channel is selected as the primary channel such that (a) the selected 2 MHz-wide channel is aligned with (i) a 2 MHz primary channel of an existing BSS having a bandwidth greater than or equal to 2 MHz or (ii) a 1 MHz TX-enabled channel of the selected 2 MHz primary channel overlaps with the 1 MHz primary channel of an existing 1 MHz BSS, or (b) the selected 2 MHz-wide channel is chosen to overlap a secondary channel of an existing BSS in an order of preference corresponding to an ordering of secondary channels of the existing BSS from the widest bandwidth to the smallest bandwidth, according to an embodiment. In an embodiment, when the selected 2 MHz-wide primary channel has a 1 MHz TX-enabled channel, selection of the 2 MHz-wide primary channel avoids, when possible, a selection that results in the 1 MHz TX-enabled channel being adjacent to a 1 MHz primary channel of a 1 MHz-wide BSS. Additionally, a 1 MHz-wide channel is selected as a 1 MHz primary channel (or 1 MHz TX-enabled channel). In an embodiment, the 1 MHz-wide channel is selected as either an upper 1 MHz-wide portion of the 2 MHz-wide primary channel or a lower 1 MHz-wide portion of the 2 MHz-wide primary channel. In an embodiment, when the selected 2 MHz-wide channel is aligned with a primary channel of an existing BSS, the 1 MHz-wide channel is selected to align with the 1 MHz-wide primary channel of the existing BSS.

In an embodiment, when the primary channel is selected according to (b) above, a 2 MHz-wide channel is selected such that the number of composite channels of the existing BSS that are overlapped is minimized.

Figure 8:
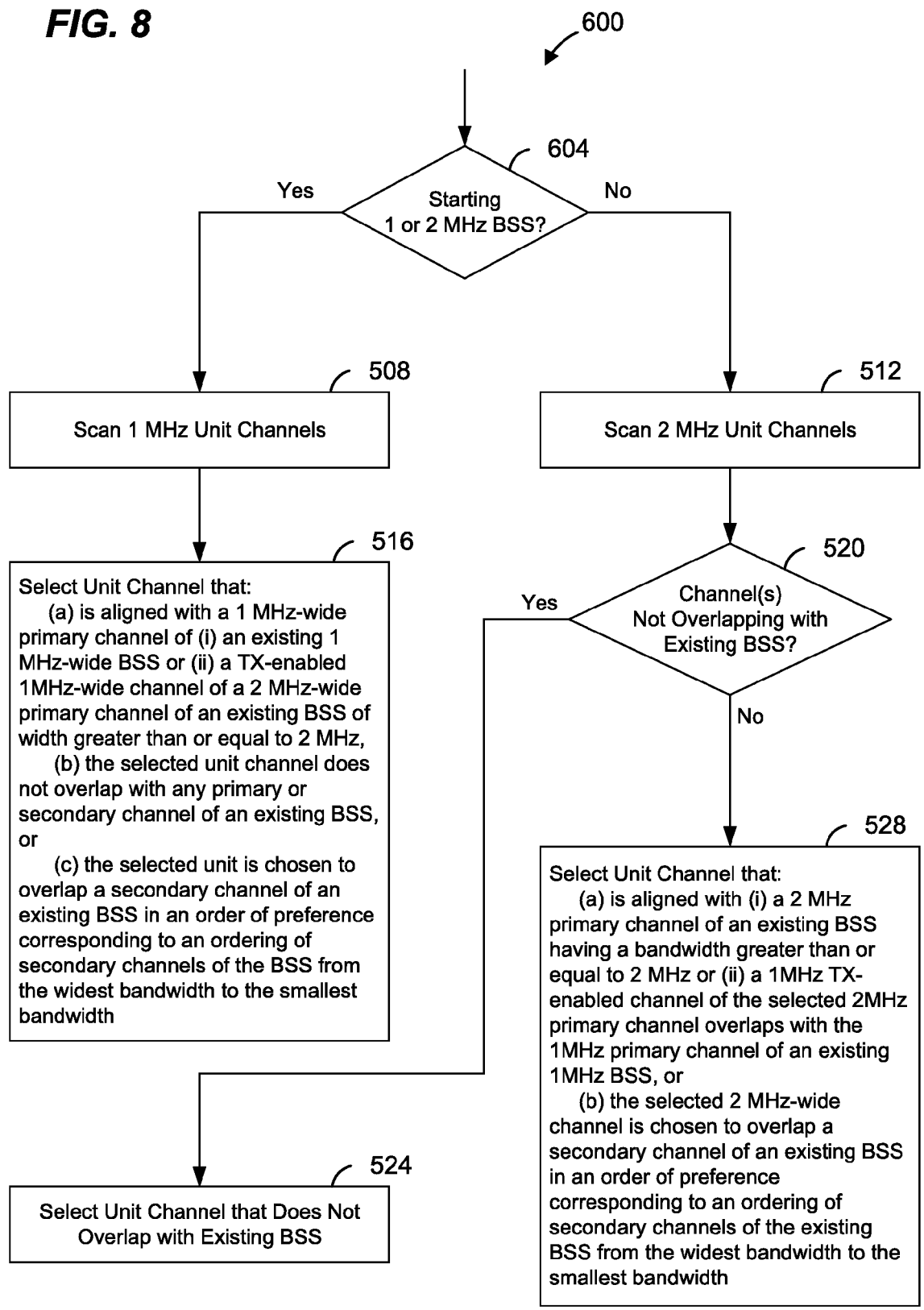
FIG. 8 is a flow diagram of another example method for selecting a primary channel, according to an embodiment.

FIG. 8 is a flow diagram of an example method 600 for selecting a primary channel for a wireless communication network. In an embodiment, the method 600 is utilized with a channelization scheme such as described above with respect to FIG. 6, and the method 600 will be discussed with reference to FIG. 6 for explanatory purposes. In other embodiments, the method 600 is utilized with another suitable channelization scheme. In an embodiment, the network interface 16 of the AP 14 of FIG. 1 is configured to implement the method 600. In other embodiments, the method 600 is implemented by another suitable communication device.

FIG. 8 includes like-numbered blocks from FIG. 7, and such like-numbered blocks are not discussed.

At block 604, it is determined whether a new BSS will utilize a channel having a bandwidth greater than 2 MHz. If the new BSS will utilize a 1 MHz-wide or 2 MHz-wide channel, the flow proceeds to block 508. On the other hand, if the new BSS will utilize a channel having a width greater than 2 MHz, the flow proceeds to block 512. In some embodiments, block 604 is omitted. For example, when a communication device (e.g., the network interface 16 of the AP 14) is configured to only utilize 1 MHz-wide and/or 2 MHz wide channels, then the method commences at block 508, according to an embodiment. Similarly, when a communication device (e.g., the network interface 16 of the AP 14) is configured to only utilize channels having a bandwidth greater than 2 MHz, then the method commences at block 512.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any tangible, non-transitory computer readable memory such as a magnetic disk, an optical disk, a RAM, a ROM, a flash memory, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device, etc.

While the present invention has been described with reference to specific examples, which are intended to be illustrative only and not to be limiting of the invention, changes, additions and/or deletions may be made to the disclosed embodiments without departing from the scope of the claims.

What is claimed is:

1. A method for selecting a primary communication channel for a wireless communication system, the method comprising:
    scanning a set of channels, each channel in the set having a first bandwidth, wherein the first bandwidth is greater than a smallest channel bandwidth available in the wireless communication system;
    determining whether one or more channels in the set of channels are not being utilized by one or more other wireless communication systems;
    when it is determined that one or more channels in the set of channels are not being utilized by one or more other wireless communication systems, selecting a channel from the one or more channels not being utilized as the primary channel for the wireless communication system; and
    when it is determined that all channels in the set of channels are being utilized by one or more other wireless communication systems,
        selecting, as the primary channel of the wireless communication system, a channel in the set that is aligned with a primary channel of another wireless communication system, or
        selecting, as the primary channel of the wireless communication system, a channel in the set that overlaps with a secondary channel of another wireless communication system, wherein the secondary channel of the other wireless communication system has a bandwidth greater than the first bandwidth.

2. The method of claim 1, further comprising, after selecting the primary channel from the set of channels, selecting a further primary channel having a second bandwidth that is a fraction of the first bandwidth, wherein the further primary channel is selected from a further set of channels that overlap the primary channel, wherein each channel in the further set of channels has a bandwidth equal to the second bandwidth.

3. The method of claim 2, wherein selecting, as the primary channel of the wireless communication system, a channel in the set that is aligned with a primary channel of another wireless communication system comprises:
    selecting a channel in the set that overlaps with a primary channel of another wireless communication system, wherein the primary channel of the other wireless communication system has a bandwidth equal to the second bandwidth; and
    selecting the further primary channel such that the further primary channel is aligned with the primary channel of the other wireless communication system.

4. The method of claim 2, wherein:
    the second bandwidth is equal to one half of the first bandwidth; and
    the further set of channels consists of two non-overlapping channels.

5. The method of claim 4, wherein:
    the first bandwidth is equal to 2 MHz; and
    the second bandwidth is equal to 1 MHz.

6. The method of claim 2, wherein the second bandwidth is the smallest channel bandwidth available in the wireless communication system.

7. The method of claim 1, wherein selecting, as the primary channel of the wireless communication system, a channel in the set that overlaps with a secondary channel of another wireless communication system comprises:
    when the other wireless communication system is utilizing multiple secondary channels having different bandwidths, each of the different bandwidths greater than the greater than the first bandwidth, selecting the primary channel according to an order of preference corresponding to an ordering of the multiple secondary channels of the other wireless communication system from a widest bandwidth to a smallest bandwidth.

8. An apparatus for performing wireless communications, the apparatus comprising:
    a network interface, wherein the network interface is configured to select a primary communication channel for a wireless communication system at least by scanning a set of channels, each channel in the set having a first bandwidth, wherein the first bandwidth is greater than a smallest channel bandwidth available in the wireless communication system, determining whether one or more channels in the set of channels is not being utilized by one or more other wireless communication systems, when it is determined that one or more channels in the set of channels are not being utilized by one or more other wireless communication systems, selecting a channel from the one or more channels not being utilized as the primary channel for the wireless communication system, when it is determined that all channels in the set of channels are being utilized by one or more other wireless communication systems,
- selecting, as the primary channel of the wireless communication system, a channel in the set that is aligned with a primary channel of another wireless communication system, or
- selecting, as the primary channel of the wireless communication system, a channel in the set that overlaps with a secondary channel of another wireless communication system, wherein the secondary channel of the other wireless communication system has a bandwidth greater than the first bandwidth.

9. The apparatus of claim 8, wherein the network interface is configured to,
after selecting the primary channel from the set of channels, select a further primary channel having a second bandwidth that is a fraction of the first bandwidth, wherein the further primary channel is selected from a further set of channels that overlap the primary channel, wherein each channel in the further set of channels has a bandwidth equal to the second bandwidth.

10. The apparatus of claim 9, wherein the network interface is configured to select, as the primary channel of the wireless communication system, a channel in the set that is aligned with a primary channel of another wireless communication system at least by
selecting a channel in the set that overlaps with a primary channel of another wireless communication system, wherein the primary channel of the other wireless communication system has a bandwidth equal to the second bandwidth, and
selecting the further primary channel such that the further primary channel is aligned with the primary channel of the other wireless communication system.

11. The apparatus of claim 9, wherein:
the second bandwidth is equal to one half of the first bandwidth; and
the further set of channels consists of two non-overlapping channels.

12. The apparatus of claim 11, wherein:
the first bandwidth is equal to 2 MHz; and
the second bandwidth is equal to 1 MHz.

13. The apparatus of claim 9, the second bandwidth is the smallest channel bandwidth available in the wireless communication system.

14. The apparatus of claim 8, wherein the network interface is configured to select, as the primary channel of the wireless communication system, a channel in the set that overlaps with a secondary channel of another wireless communication system at least by,
when the other wireless communication system is utilizing multiple secondary channels having different bandwidths, each of the different bandwidths greater than the greater than the first bandwidth, selecting the primary channel according to an order of preference corresponding to an ordering of the multiple secondary channels of the other wireless communication system from a widest bandwidth to a smallest bandwidth.

15. A method for selecting a primary communication channel for a wireless communication system, the method comprising:
scanning a set of channels, each channel in the set having a first bandwidth;
determining whether one or more channels in the set of channels are not being utilized by one or more other wireless communication systems;
when it is determined that one or more channels in the set of channels are not being utilized by one or more other wireless communication systems, selecting a channel from the one or more channels not being utilized as the primary channel for the wireless communication system; and
when it is determined that all channels in the set of channels are being utilized by one or more other wireless communication systems,
- selecting, as the primary channel of the wireless communication system, a channel in the set that is aligned with a primary channel of another wireless communication system, or
- selecting, as the primary channel of the wireless communication system, a channel in the set that overlaps with a secondary channel of another wireless communication system, wherein the secondary channel of the other wireless communication system has a bandwidth greater than the first bandwidth.

16. The method of claim 15, wherein selecting, as the primary channel of the wireless communication system, a channel in the set that is aligned with a primary channel of another wireless communication system comprises:
selecting a channel in the set that (i) overlaps with a first primary channel of another wireless communication system, wherein the first primary channel of the other wireless communication system has a bandwidth equal to a second bandwidth greater than the first bandwidth, and (ii) is aligned with a second primary channel of the other wireless communication system, wherein the second primary channel of the other wireless communication system has a bandwidth equal to the first bandwidth.

17. The method of claim 16, wherein:
the second bandwidth is equal to twice the first bandwidth; and
the first primary channel of the other wireless communication system consists of two non-overlapping channels each having a bandwidth equal to the first bandwidth.

18. The method of claim 16, wherein:
the first bandwidth is equal to 1 MHz; and
the second bandwidth is equal to 2 MHz.

19. The method of claim 15, wherein selecting, as the primary channel of the wireless communication system, a channel in the set that overlaps with a secondary channel of another wireless communication system comprises:
when the other wireless communication system is utilizing multiple secondary channels having different bandwidths, each of the different bandwidths greater than the greater than the first bandwidth, selecting the primary channel according to an order of preference corresponding to an ordering of the multiple secondary channels of the other wireless communication system from a widest bandwidth to a smallest bandwidth.

20. The method of claim 15, wherein each channel in the set of channels is adjacent to at least one other channel in the set of channels.

21. The method of claim 15, wherein channels in the set of channels are spaced apart from each other by at least the first bandwidth.

22. An apparatus for performing wireless communications, the apparatus comprising:
- a network interface, wherein the network interface is configured to select a primary communication channel for a wireless communication system at least by
    - scanning a set of channels, each channel in the set having a first bandwidth,
    - determining whether one or more channels in the set of channels is not being utilized by one or more other wireless communication systems,
    - when it is determined that one or more channels in the set of channels are not being utilized by one or more other wireless communication systems, selecting a channel from the one or more channels not being utilized as the primary channel for the wireless communication system, and
    - when it is determined that all channels in the set of channels are being utilized by one or more other wireless communication systems,
        - selecting, as the primary channel of the wireless communication system, a channel in the set that is aligned with a primary channel of another wireless communication system, or
        - selecting, as the primary channel of the wireless communication system, a channel in the set that overlaps with a secondary channel of another wireless communication system, wherein the secondary channel of the other wireless communication system has a bandwidth greater than the first bandwidth.

23. The apparatus of claim 22, wherein the network interface is configured to select, as the primary channel of the wireless communication system, a channel in the set that is aligned with a primary channel of another wireless communication system at least by
- selecting a channel in the set that (i) overlaps with a first primary channel of another wireless communication system, wherein the first primary channel of the other wireless communication system has a bandwidth equal to a second bandwidth greater than the first bandwidth, and (ii) is aligned with a second primary channel of the other wireless communication system, wherein the second primary channel of the other wireless communication system has a bandwidth equal to the first bandwidth.

24. The apparatus of claim 23, wherein:
the second bandwidth is equal to twice the first bandwidth; and
the first primary channel of the other wireless communication system consists of two non-overlapping channels each having a bandwidth equal to the first bandwidth.

25. The apparatus of claim 23, wherein:
the first bandwidth is equal to 1 MHz; and
the second bandwidth is equal to 2 MHz.

26. The apparatus of claim 22, wherein the network interface is configured to select, as the primary channel of the wireless communication system, a channel in the set that overlaps with a secondary channel of another wireless communication system at least by,
- when the other wireless communication system is utilizing multiple secondary channels having different bandwidths, each of the different bandwidths greater than the greater than the first bandwidth, selecting the primary channel according to an order of preference corresponding to an ordering of the multiple secondary channels of the other wireless communication system from a widest bandwidth to a smallest bandwidth.

27. The apparatus of claim 22, wherein each channel in the set of channels is adjacent to at least one other channel in the set of channels.

28. The apparatus of claim 22, wherein channels in the set of channels are spaced apart from each other by at least the first bandwidth.

* * * * *